UNITED STATES PATENT OFFICE 2,274,936

MANUFACTURE OF CONCRETE OR MORTAR

Carl Pontoppidan, Holte, Denmark, assignor to F. L. Smidth & Co., New York, N. Y., a corporation of New Jersey No Drawing. Application May 26, 1939, Serial No. 275,852. In Great Britain May 30, 1938

11 Claims. (Cl. 106—97)

This invention relates to the manufacture of mortar or concrete from hydraulic cements produced by a burning reaction, of which standard Portland cement and modified Portland cements of the low heat and high early strength types are examples.

Most, if not all, hydraulic cements contain potassium and sodium in the form of various compounds, particularly oxides, silicates, aluminates, sulphates, sulphides and chlorides, and the total content of these compounds, calculated as potassium oxide, is generally between 0.5 and 2.0% of the cement. All these compounds, which will be referred to as alkali compounds, are soluble in water, and when hydraulic cements are mixed with water and stirred some of the alkali compounds will pass into solution. If all the compounds do not pass into solution the reason is that the hydration of the coarser cement grains only proceeds slowly, and the compounds present in the interior of these grains can only pass into solution as the hydration proceeds. Tests that I have made show that the amounts of the alkali compounds going into solution when cement is stirred with water for five minutes vary between 10 and 60% of the total amount of the alkali compounds present in the cement. If the cement is stirred for more than five minutes only a little more of the total alkali compounds go into solution. The potassium salts go into solution much more readily than the sodium salts, and naturally hot water gives better extraction than cold water.

Now the presence of these alkali compounds in concrete may be detrimental to the concrete. When the excess water in the concrete evaporates, the alkali compounds are left behind and, if the evaporation takes place from the surface of the concrete, the alkali compounds are naturally left in the layer beneath the surface. When this surface layer, after the drying and hardening have taken place, is wetted again, the alkali compounds may be leached out so that the surface layer may become more or less porous and thus less resistant to wear and to the influence of water and weather conditions in general. My tests also show that the compression and tensile strength of the cement are reduced somewhat by the presence of these components. In general, it may be said that the presence of the alkali compounds makes concrete or mortar less stable and less resistant.

The object of this invention is to produce more stable and resistant concrete and mortar by extracting the alkali compounds from the cement.

In making mortar or concrete according to the invention, I extract by means of water alkali compounds that are present in the cement and soluble in water, and I effect this extraction before the cement is mixed with aggregate. I prefer to mix the cement with water in an amount in excess of that required in the mixing, to allow the compounds to go into solution in this water, and then to remove the excess water from the cement slurry. It is sometimes desirable to repeat this process before mixing the cement with aggregate and forming the mortar or concrete in order to remove all the alkali compounds that will go into solution.

As an illustration of the quantity of water that may be used I find that four times as much water as cement by weight gives good results.

In order to remove the excess water, it is generally necessary to use filtration. Thus I may use a filtering machine, but I prefer simply to allow the cement and water to settle, and to place on a sand bed the slurry that settles in the sedimentation tank, so as to remove the remainder of the water from it by filtration. This sand may be that which is to be used as an aggregate and the separation may be accelerated by applying suction below the bed of sand or pressure above it. Again, I may remove the excess water by ordinary sedimentation by means, for example, of that kind of sedimentation apparatus called a "thickener" or by a slurry centrifuge.

In order to accelerate the sedimentation or settling of the cement slurry, a settling agent such, for example, as aluminium sulphate or casein in milk form may be added to the mixture of cement and water.

The invention is particularly useful in the production of so-called mass concrete, that is to say, concrete which is never moved when once it has set, such as concrete used in roads, bridges, houses, dams, piers, foundations and so forth, as distinguished from cast concrete blocks and the like which are formed as independent units or articles and then put in position.

Some hydraulic cements, and in particular Portland cement, contain gypsum, the presence of which is necessary in order to regulate the setting time. Gypsum is somewhat soluble in water, so that if the cement is stirred with an excess of water and the excess is removed some of the gypsum is removed also. In consequence the setting time of the cement is altered. To avoid this the water used for the extraction may be saturated, or partly saturated, in gypsum; for example, it may be passed through a tank filled with pieces of rock gypsum. The use of such saturated water does not affect the solubility of the alkali compounds in the water, but it prevents any of the gypsum in the cement from going into solution.

Instead of using either fresh water or a gypsum solution for extracting alkali compounds the excess water from a previous treatment may be used. The percentage of alkali compounds in solution in this excess water is very low when the water has only been used once. For instance, if the cement contains altogether 0.9% of alkali compounds and only 30% of these go into solution, and if the amount of water added to the cement is four times the quantity of cement, the water will only contain 0.0675 part of alkali compounds in solution in each 100 parts of water. At the same time, if the same water is used over again it will soon become saturated in gypsum and stay saturated, so that in this case there is no need to use water that has been specially saturated in gypsum for the purpose.

I claim:

1. In the manufacture of mortar or mass concrete from hydraulic cement produced by a burning reaction and aggregate, the steps which comprise aqueously extracting from the cement water-soluble alkali compounds, separating the cement from the aqueous extracting medium, and thereafter mixing the cement with the aggregate.

2. In the manufacture of mortar or mass concrete from hydraulic cement produced by a burning reaction and aggregate, the steps which comprise forming a slurry by mixing the cement with water in an amount in excess of that required in the mixing of the mortar or concrete, allowing water-soluble alkali compounds present in the cement to go into solution in the water of said slurry, removing said excess of water from said slurry, and mixing the dewatered cement slurry with the aggregate.

3. In the manufacture of mortar or mass concrete from hydraulic cement produced by a burning reaction and aggregate, the steps which comprise forming a slurry by mixing the cement with water in an amount in excess of that required in the mixing of the mortar or concrete, allowing water-soluble alkali compounds present in the cement to go into solution in the water of said slurry, removing said excess of water from the slurry, repeatedly adding water and removing it again until the slurry is deprived of substantially all the water-soluble alkali compounds, and mixing the dewatered cement slurry with the aggregate.

4. In the manufacture of mortar or concrete from hydraulic cement produced by a burning reaction and aggregate, the steps which comprise forming a slurry by mixing the cement with water in an amount in excess of that required in the mixing of the mortar or concrete, allowing water-soluble alkali compounds present in the cement to go into solution in the water of said slurry, filtering said slurry to remove the excess of said water therefrom, and mixing the dewatered cement slurry with the aggregate.

5. In the manufacture of mortar or concrete from hydraulic cement produced by a burning reaction and aggregate, the steps which comprise forming a slurry by mixing the cement with water in an amount in excess of that required in the mixing of the mortar or concrete, allowing water-soluble alkali compounds present in the cement to go into solution in the water of said slurry, placing said slurry on a sand bed to remove said excess of water therefrom by filtration, and mixing the dewatered cement slurry with said sand.

6. In the manufacture of mortar or concrete from hydraulic cement produced by a burning reaction and aggregate, the steps which comprise forming a slurry by mixing the cement with water in an amount in excess of that required in the mixing of mortar or concrete, allowing water-soluble alkali compounds present in the cement to go into solution in the water of said slurry, placing said slurry on a sand bed to remove said excess of water therefrom by filtration, accelerating the filtration process by applying differential air pressures on opposite sides of said bed, and mixing the dewatered cement slurry with said sand.

7. In the manufacture of mortar or concrete from hydraulic cement produced by a burning reaction and aggregate, the steps which comprise forming a slurry by mixing the cement with water in an amount in excess of that required in the mixing of mortar or concrete, allowing water-soluble alkali compounds present in the cement to go into solution in the water of said slurry, removing said excess of water from the slurry by subjecting it to a sedimentation treatment, and mixing the dewatered cement slurry with said sand.

8. In the manufacture of mortar or concrete from hydraulic cement produced by a burning reaction and aggregate, the steps which comprise forming a slurry by mixing the cement with water in an amount in excess of that required in the mixing of mortar or concrete, allowing water-soluble alkali compounds in the cement to go into solution in the water of said slurry, removing said excess of water from the slurry by subjecting it to a sedimentation treatment after having first added to the cement slurry a settling agent with a view to accelerate said sedimentation treatment, and mixing the dewatered cement slurry with said sand.

9. In the manufacture of mortar or concrete from hydraulic cement produced by a burning reaction and aggregate, the steps which comprise treating the hydraulic cement with water at least partly saturated in gypsum, whereby to extract alkali compounds present in the cement and soluble in water, separating said cement from the water containing said alkali compounds, and thereafter mixing the cement with the aggregate.

10. In the manufacture of mortar or concrete from hydraulic cement produced by a burning reaction and aggregate the steps which comprise treating the hydraulic cement with water which has beforehand been used for the same purpose a number of times and which is, therefore, at least partly saturated in gypsum, thereby extracting alkali compounds present in the cement and soluble in water, separating said cement from the water containing said alkali compounds, and thereafter mixing the cement with the aggregate.

11. In the manufacture of mortar or concrete from hydraulic cement produced by a burning reaction and aggregate, the steps which comprise mixing about one part by weight of cement with about four parts by weight of water so as to form a slurry, allowing water-soluble alkali compounds present in the cement to go into solution in the water of said slurry, removing the excess of water from said slurry, and mixing the partially dewatered cement slurry with the aggregate.

CARL PONTOPPIDAN.